United States Patent [19]

Matsumoto et al.

[11] Patent Number: 4,639,889
[45] Date of Patent: Jan. 27, 1987

[54] SYSTEM FOR CONTROLLING COMMUNICATION BETWEEN A MAIN CONTROL ASSEMBLY AND PROGRAMMABLE TERMINAL UNITS

[75] Inventors: Hiromichi Matsumoto; Ritsuo Hashimoto, both of Kyoto, Japan

[73] Assignee: Omron Tateisi Electronics Company, Kyoto, Japan

[21] Appl. No.: 651,639

[22] Filed: Sep. 17, 1984

Related U.S. Application Data

[63] Continuation of Ser. No. 550,061, Nov. 9, 1983, abandoned, which is a continuation of Ser. No. 235,951, Feb. 19, 1981, abandoned.

[30] Foreign Application Priority Data

| Feb. 19, 1980 | [JP] | Japan | 55-19919 |
| Mar. 12, 1980 | [JP] | Japan | 55-32031 |
| Mar. 12, 1980 | [JP] | Japan | 55-32032 |
| Mar. 14, 1980 | [JP] | Japan | 55-33149 |

[51] Int. Cl.⁴ .................... G06F 15/16; G06F 11/06
[52] U.S. Cl. ................. 364/900; 235/379; 371/62
[58] Field of Search ............ 364/200, 900, 405; 235/379, 380; 371/62

[56] References Cited

U.S. PATENT DOCUMENTS

| 3,761,682 | 9/1973 | Barnes et al. | 235/379 |
| 3,810,120 | 5/1974 | Huettner et al. | 364/200 |
| 3,866,175 | 2/1975 | Seifert et al. | 340/152 |
| 3,937,925 | 2/1976 | Boothroyd | 364/900 |
| 3,956,615 | 5/1976 | Anderson et al. | 235/379 |
| 4,166,945 | 9/1979 | Inoyama et al. | 364/900 |
| 4,225,779 | 9/1980 | Sano et al. | 364/900 |
| 4,314,352 | 2/1982 | Fought | 364/900 |
| 4,319,336 | 3/1982 | Anderson et al. | 364/200 |
| 4,355,369 | 10/1982 | Garvin | 364/900 |
| 4,365,294 | 12/1982 | Stokken | 364/200 |

FOREIGN PATENT DOCUMENTS

| 46-5413 | 11/1971 | Japan . |
| 48-19149 | 3/1973 | Japan . |
| 49-11241 | 1/1974 | Japan . |
| 49-40446 | 4/1974 | Japan . |
| 52-155024 | 12/1977 | Japan . |
| 53-66337 | 6/1978 | Japan . |
| 54-12239 | 1/1979 | Japan . |
| 54-31250 | 3/1979 | Japan . |
| 54-116147 | 9/1979 | Japan . |
| 1234698 | 6/1971 | United Kingdom . |
| 1341686 | 12/1973 | United Kingdom . |
| 1494841 | 12/1977 | United Kingdom . |

OTHER PUBLICATIONS

*Computer Dictionary and Handbook,* Sippl et al, 1980, pp. 51-52 and 597-598.

*Primary Examiner*—Gareth D. Shaw
*Assistant Examiner*—Daniel K. Dorsey
*Attorney, Agent, or Firm*—Armstrong, Nikaido, Marmelstein & Kubovcik

[57] ABSTRACT

A data communication system comprises a plurality of terminal units having different addresses individually and a main control assembly connected to the terminal units by transmission lines for controlling the terminal units. The terminal units include a first group of terminal units and second group of terminal units. The main control assembly controls the first group of terminal units according to a series of instructions for controlling the units in a predetermined sequence. When executing one instruction, the main control assembly performs data communication with only the one specific terminal unit relevant to the instruction. Concomitantly with the communication with the specific terminal unit, the main control assembly scans and communicates with the second group of terminal units only during periods that specified conditions exist. In addition, means are provided for communicating malfunction information between the main control assembly and the terminal units.

12 Claims, 13 Drawing Figures

SYSTEM FOR CONTROLLING COMMUNICATION BETWEEN A MAIN CONTROL ASSEMBLY AND PROGRAMMABLE TERMINAL UNITS

This application is a continuation of application Ser. No. 550,061, filed Nov. 9, 1983 which is a continuation of Ser. No. 235,951, filed Feb. 19, 1981, both now abandoned.

BACKGROUND OF THE INVENTION

1. Field of the Invention

The present invention relates to a system for controlling data communication between a plurality of terminal units containing information and a main control assembly connected to the terminal units by transmission lines for controlling the terminal units. A number of the terminal units are controlled in a predetermined sequence in accordance with the main program of the main control assembly. The other terminal units are not included in the sequential processing under the main program.

2. Description of the Prior Art

With systems comprising a plurality of terminal units and a main control unit connected to the terminal units by transmission lines and having a central processor for controlling the terminal units, a mode of communication control is already known in which the main control unit transmits to the terminal units a message containing a terminal unit designating address, and one of the terminal units whose address is identical with the address of the received message transmits a response message to the main control unit. When the terminal unit has the data to be sent to the main control unit, the terminal unit transmits the data to the main control unit in response to the message from the control unit. With the conventional method of communication control, however, the exchange of messages between the main control unit and the terminal units is conducted entirely independently of (non-synchronously with) the main program of the main control unit comprising a series of instructions for the terminal units. Accordingly the main control unit is unable to perform data communication only with the terminal unit desired for executing the work of a particular step of the main program. The conventional method therefore has the drawback of being low in transmission line efficiency and having poor work performing speed.

It appears useful to effect communication control in corresponding relation to the main program so that for each step of the main program of the main control unit, the main control unit performs data communication only with the terminal unit which is needed for performing the work of the step. Such communication control is desirable when the terminal units are controllable in a predetermined sequence according to the main program of the main control unit. However, if the terminal units include a terminal unit which does not participate in the sequential processing under the main program of the main control unit, difficulties arise in the data communication between that terminal unit and the main control unit.

On the other hand, with systems comprising a main control unit and terminal units therefor, one must monitor or watch the other to check for troubles or malfunctions. When the terminal units are adapted to watch the main control unit in the prior art, each of the terminal units checks whether or not the message addressed to the terminal unit by the main control unit is transmitted within a specified period of time to detect the possible malfunction. Each terminal unit is therefore provided with a monitoring timer and resets the timer when the address of the received message is identical with its own address, and detects a malfunction of the main control unit when the time set on the timer is over and no such message is received.

This method of monitoring nevertheless heavily burdens the main control unit since the unit must poll some message to all the terminal units within the predetermined period of time. The larger the number of the terminal units, the greater is the burden on the main control unit. The main control unit may have to poll the terminal units merely to reset their monitoring timers. This leads to a reduced line efficiency.

When the power for the terminal unit is restored after a failure, or when the terminal unit has detected a malfunction in the main control unit, the terminal unit notifies the main unit of the malfunction in the following manner.

(1) The terminal transmits to the main unit a message indicating the power after the restoration or to the effect that a malfunction has been detected.

(2) The terminal unit remains non-responsive when the power is restored, for at least such a period of time as to enable the main unit to judge that the terminal is not responsive to a message from the main unit.

However, the first method requires a program for the main unit to analyze the message from the terminal unit, while such a program is complex. With the second method, the terminal unit remains non-responsive for an unduly prolonged period of time despite the restoration of power, causing a waste of time.

SUMMARY OF THE INVENTION

An object of the present invention is to effect communication control for a plurality of terminal units in a predetermined sequence according to the main program of a main control assembly to assure an improved line efficiency and a higher work performing speed and also to simplify the control of the terminal units for concurrent processing.

The data communication control provided by the invention is useful also for a system comprising a plurality of terminal units in which a number of specific terminal units are controllable in a predetermined sequence according to the main program of a main control assembly, and other terminal units are not included in the sequential processing under the main program.

Another object of the invention is to provide a data communication control system in which data communication between a main control assembly and specific terminal units is effected according to the main program of the assembly and which also permits data communication between the main control assembly and other terminal units not included in the sequential processing under the main program.

Another object of the invention is to provide a system in which a plurality of terminal units connected to a main control assembly can check the main control assembly for malfunctions without burdening the assembly and without entailing a reduced line efficiency.

Still another object of the invention is to provide a system of the type described in which the main control assembly can be quickly and reliably informed of the restoration of power for the terminal after a failure and also of the malfunction of the assembly detected by the terminal unit, without complicating the processing by the main control assembly.

The present invention provides a system for controlling data communication between a plurality of terminal units having different addresses individually and a main control assembly connected to the terminal units by transmission lines for controlling the terminal units. The terminal units include first group of terminal units controllable in a predetermined sequence, and other terminal units not included in the sequence. The main control assembly comprises first memory means having stored therein a series of instructions for controlling the first terminal units in the predetermined sequence, processing means for reading each of the instructions one by one from the first memory means and editing a message corresponding to the read instructions, and communication means for transmitting the message to the corresponding terminal unit, so that when executing one instruction, the main control assembly performs data communication with only one terminal unit relevant to the instruction.

For communication with the other terminal units, the main control assembly has second memory means having stored therein at least the addresses of the other terminal units. Concomitantly with the communication with one of the first group of terminal units, the main control assembly scans the other terminal units stored in the second memory means and communicates with the same, provided that specified conditions are fulfilled.

The messages exchanged between the main control assembly and the terminal units always contain the address of the terminal unit concerned. When a message is transmitted from the assembly to a terminal unit, such an address indicates the receiver unit, while when a message is transmitted from a terminal unit to the main assembly, the address designates the sender unit. Each of the terminal units further has communication means responsive to a message transmitted from the main control assembly when the address in the message is identical with its own address to transmit to the main control assembly a message containing its own address. The main control assembly further has a response time monitoring timer, and the terminal unit has a communication interval monitoring timer.

In the data communication system of this invention, malfunctions are checked by a method characterized in that the terminal unit, when detecting a malfunction, is responsive only to a specific message transmitted from the main control assembly, and that the main control assembly transmits the specific message to the terminal unit if the terminal unit still fails to respond even when a period of time exceeding the time set on the response time monitoring timer has elapsed after the transmission of a message to the terminal unit.

According to the invention, malfunctions are checked by another method in which the main control assembly is checked for malfunctions by the terminal units and which is characterized in that the terminal unit resets the communication interval monitoring timer upon receiving a message from the main control assembly free of any transmission error irrespective of whatever terminal unit address may be contained in the received message, and detects a malfunction in the main control assembly when the communication interval monitoring timer remains unreset after the lapse of the time set on the timer. With the data communication control of the present invention described above, the main control assembly, when executing one instruction, performs data communication only with the terminal unit relevant to the instruction. According to the method of checking malfunctions described above, the terminal unit resets the communication interval monitoring timer even if the address of the received message is not in agreement with its own address, so that the present method of malfunction deflection is very convenient for the data communication control of this invention.

The present invention will become more apparent from the following description of embodiments with reference to the accompanying drawings.

DESCRIPTION OF THE PREFERRED EMBODIMENTS

The present invention will be described below with reference to an automatic cash dispenser embodying the invention. The automatic cash dispenser, which is one of several systems for performing banking transactions, is adapted for use with magnetic cards having magnetically recorded therein the identification number, account number and other data of a particular customer. The invention is of course useful for other systems for performing banking transactions, such as automatic cash depositing machines, etc.

Figure 1:
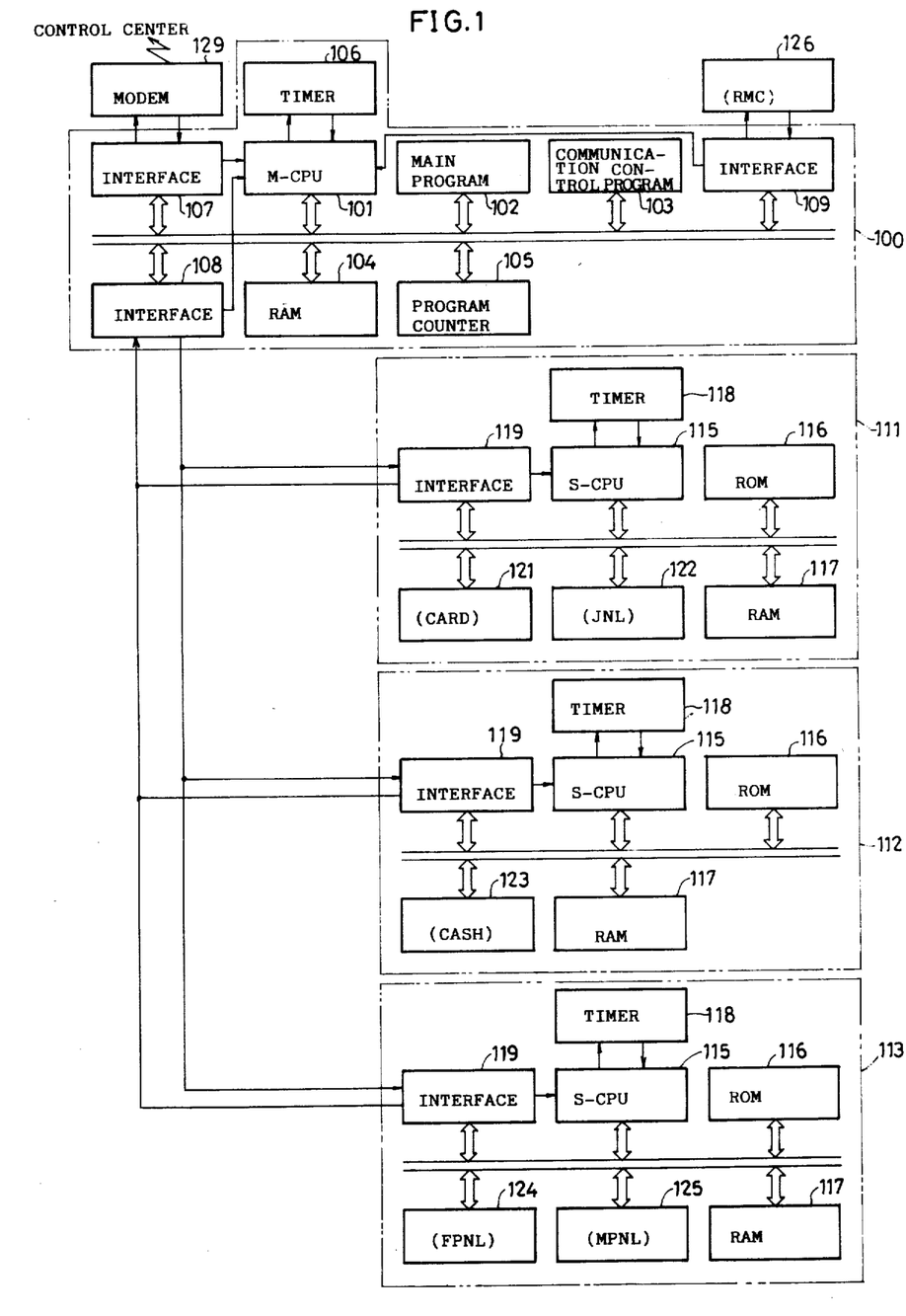
FIG. 1 is a block diagram schematically showing the construction of an automatic cash dispenser.

FIG. 1 shows the construction of the automatic cash dispenser. As is well known, the automatic cash dispenser includes a magnetic card reader 121 for reading magnetic cards each having magnetically recorded therein the identification number (ID number), account number and other data of a customer, a receipt issuing device 122 by which transaction data, such as the date of transaction, account number, dispensed sum and balance, are printed on the journal as a record for the bank and also on a receipt which is delivered to the customer as his record, a bank note delivery device 123 for counting the number of bank notes to be dispensed and delivering the bank notes, a customer operation panel and controller therefor 124, and a monitor panel and controller therefor 125. The customer operation panel has a keyboard including a ten-key arrangement for entering numerical data such as ID number, sum, etc., a confirming key and other keys, a numerical display for indicating the ID number, sum, etc., and a procedure display for successively showing procedural instructions for the customer to execute the instructions. The monitor panel has a power supply switch, a change-over switch for maintaining or interrupting the transaction service, a test mode setting device, a date setting device and displays for indicating the states selected or set. The customer operation panel, which is handled by the customer, is disposed on the front side of the dispenser. The monitor panel, which is operated by the bank clerk, is disposed on the rearside or a lateral side of the dispenser, i.e. at a location not accessible by the customer.

According to the present embodiment, the magnetic card reader 121 and the receipt issuing device 122 constitute a module component 111, the bank note delivery device 123 constitutes a module component 112, and the customer operation panel and controller therefor 124 and the monitor panel and the controller therefor 125 constitute a module component 113. Each of the components 111 to 113 is controlled by a slave central processing unit (termed "S-CPU") 115. However, since the card reader 121, receipt issuing device 122, bank note delivery device 123, customer operation panel and controller therefor 124, and monitor panel and controller therefor 125 are each separate terminal units (which should be called "input/output units" rather than terminal units but are herein termed "terminal units"), they are given different addresses, "CARD," "JNL," "CASH," "FPNL" and "MPNL," respectively. The module components 111 to 113 are each provided with ROM 116 storing the program of S-CPU 115, RAM 117 for storing various data, an interface 119 for the communication of data between the component and a main control assembly 100, and a communication interval watching timer 118 for watching troubles.

A remote monitor 126 is disposed also as a terminal unit and given an address "RMC". As is the case with the monitor panel, the remote monitor 126 is provided with like switches, setting devices, displays, S-CPU, ROM, RAM and interface. The remote monitor 126 is disposed at a location away from the case dispenser. The card reader 121, receipt issuing device 122, bank note delivery device 123 and customer operation panel and controller therefor 124, which are one group of terminal units, are controlled in a predetermined sequence according to the main program of the main control assembly 100. The monitor panel and controller therefor 125 and the remote monitor 126 are a second group of terminal units which are not included in the sequential processing under the main program.

The main control assembly 100 comprises a master central processing unit (termed "M-CPU") 101 for controlling the terminal units 121 to 124 in accordance with the main program, for controlling the other terminal units 125 and 126 and for controlling the communication with a control center (not shown), RAM 104 for storing various data, ROM 102 having the main program stored therein, ROM 103 having a communication control program stored therein, a program counter 105, an interface 108 for the communication of data with the module components 111 to 113, an interface 107 for the communication of data with the control center, an interface 109 for the communication of data with the remote monitor 126, and a response time monitoring timer 106. The main control assembly 100 is connected to the module components 111 to 113 and the remote monitor 126 by four communication lines including data sending lines and data receiving lines. Serial data is transmitted through these lines. Each of the interfaces 107 to 109 and 119 comprises a receiver, driver, parallel-serial and serial-parallel converter and direct memory access (DMA) control circuit. Data is transferred directly from RAM to RAM under DMA control. Upon receipt of data, each interface feeds an interruption signal to the corresponding CPU. Such DMA control is already known and will not be described. The communication between the control center and the main control assembly 100 is effected through a modulator and demodulator circuit (MODEM) 129.

Figure 2:
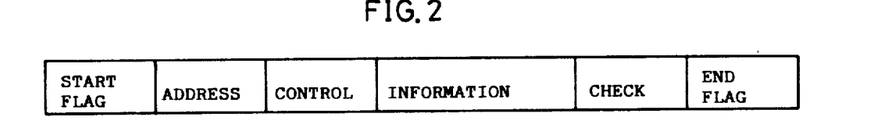
FIG. 2 shows the format of a message to be transferred between a main control assembly and terminal units.

FIG. 2 shows the format of message to be transmitted between the main control assembly 100 and the terminal units 121 to 126. The format is called "frame" and standardized. One message is transmitted by one frame. The frame is composed of six fields, namely start flag field, address field, control field, information field, check field and end flag field. The start flag and the end flag indicate the beginning and end of the frame. Transmission error checking is started with the start flag and terminated with the end flag. The address of the address field always indicates the address of the terminal unit. When a message is sent from the main control assembly 100 to a terminal unit, the address indicates the receiving terminal unit. Conversely when a message is sent from a terminal unit to the main control assembly 100, the address indicates the sender unit. The control field data contains commands including an input/output command (IOPT), wait command (WAIT) and initial command (SNRM, i.e. set normal response mode). The information field contains data such as control codes to be given to terminal units for reading (IN, READ), counting (STOR), printing (PRINT), writing (WRIT) and return or delivery (OUT), response data from the terminal units in reply of such control codes, and data indicating malfunctions, errors or the like of terminal units. The check field is used for checking whether or not the contents of the frame have been transmitted correctly.

The command (IOPT) causes a terminal unit to perform the specified operation and is accompanied by the corresponding one of the control codes mentioned above. A message with some data in the information field is an I frame. A message with no data in the information field is an RR frame (receive ready frame). The command (WAIT) means waiting for a response. A message containing the command (WAIT) is an RR frame message. When a response or data is to be sent to the main control assembly 100 from a terminal unit, the data is sent in synchronism with the RR frame message from the main control assembly 100. The initial command (SNRM) is used when the power supply is turned on or a malfunction is detected. A message containing this command is an IM frame.

Figure 3:
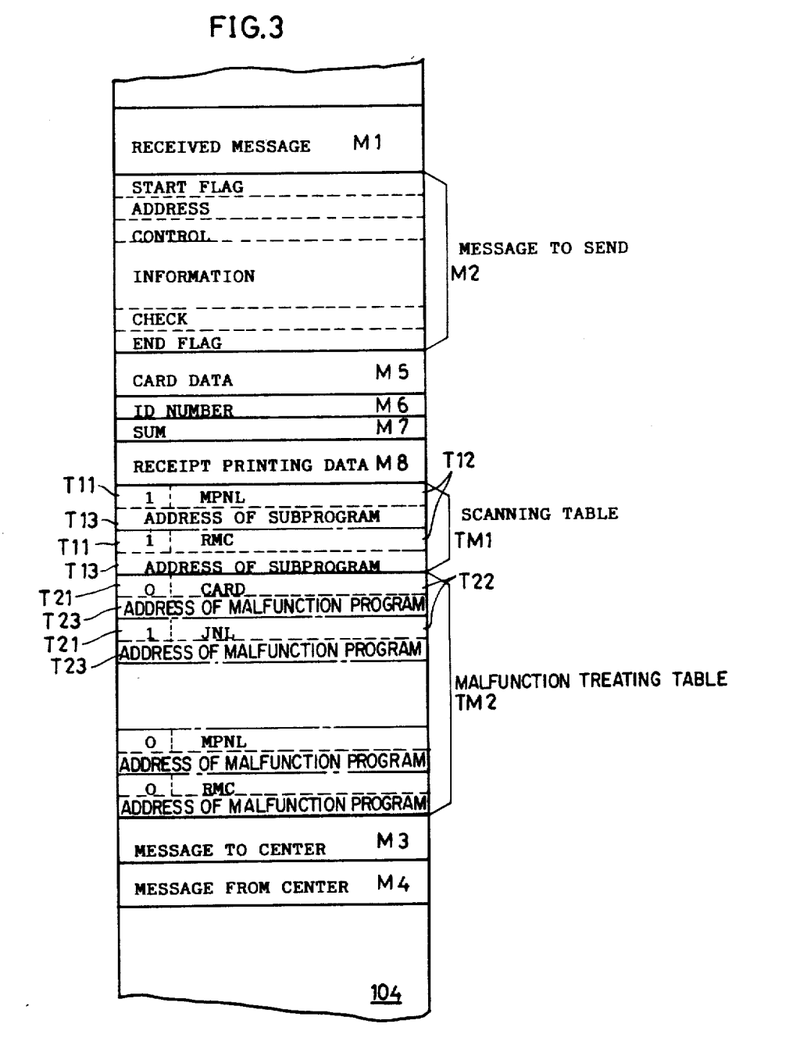
FIG. 3 shows the contents of RAM in the main control assembly.

FIG. 3 shows some of contents of the RAM 104 in the main control assembly 100. The RAM 104 includes areas M1 and M2 which are used for communication with terminal units, the area M1 being adapted for storing the received messages and the area M2 for storing the messages to send, areas M3 and M4 which are used for communication with the center, the area M3 being adapted for storing the messages to be sent to the center and the area M4 for storing the messages received from the center, and areas M5 to M8 for storing the card data, ID number, sum and receipt printing data, respectively, needed for dispensing cash. When a message containing card data, ID number or sum is sent from the terminal unit concerned to the area M1 under DMA control, the data is stored in the corresponding area of M5 to M7 by the M-CPU 101 and added to the message in the area M3 to be sent to the center during communication with the center. The receipt printing data is contained in the message in the area M4 received from the center and is transferred from the area M4 to the area M8. When controlling the receipt issuing device 122, this data is inserted into a message to the device 122. Stored in the outgoing message area M2 are a start flag, address, control bits, information, check bits and end flag like the frame format shown in FIG. 2.

The RAM 104 is provided with a scanning table TM1 for the monitor panel and controller therefor 125, and for the remote monitor 126, and a malfunction treating table TM2 for all the terminal units. The scanning table TM1 has, for each of the terminal units, a memory location T11 used as a scanning register flag, a memory location T12 for the address of the unit, and a location T13 for storing the address of the location where a subprogram unique to the terminal unit is stored. The subprograms and the malfunction treating programs to be described later are stored in either one of the ROM's 102 and 103, or in other ROM (not shown). As already described, the first group of terminal units other than the monitor panel and controller therefor 125 and the remote monitor 126 are controlled in a predetermined sequence according to the main program, but the control programs for the other group of terminals comprising units 125 and 126 are not contained in the main program. The monitor panel and controller therefor 125 and the remote monitor 126 are concomitantly scanned only during communication with the first terminal units and are allowed to transmit data to the main control assembly 100 only when so scanned. The main control assembly 100 scans only for the registered terminal unit. The presence or absence of register is judged according to the state of the flag at the memory location T11. When the scanning register flag is "1," this indicates the presence of register. As will become apparent later, when the main control assembly 100 scans the terminal units 125 and 126 and a message other than an RR frame is returned from these units 125 and 126, the main control assembly executes the subprogram specified by the address in the memory location T13.

The malfunction treating table TM$_2$ is provided, for each terminal unit, with a memory location T21 used as a malfunction flag, a location T22 for storing the address of the terminal unit, and a location T23 for storing the address of the malfunction treating program of the terminal unit.

Figure 4:
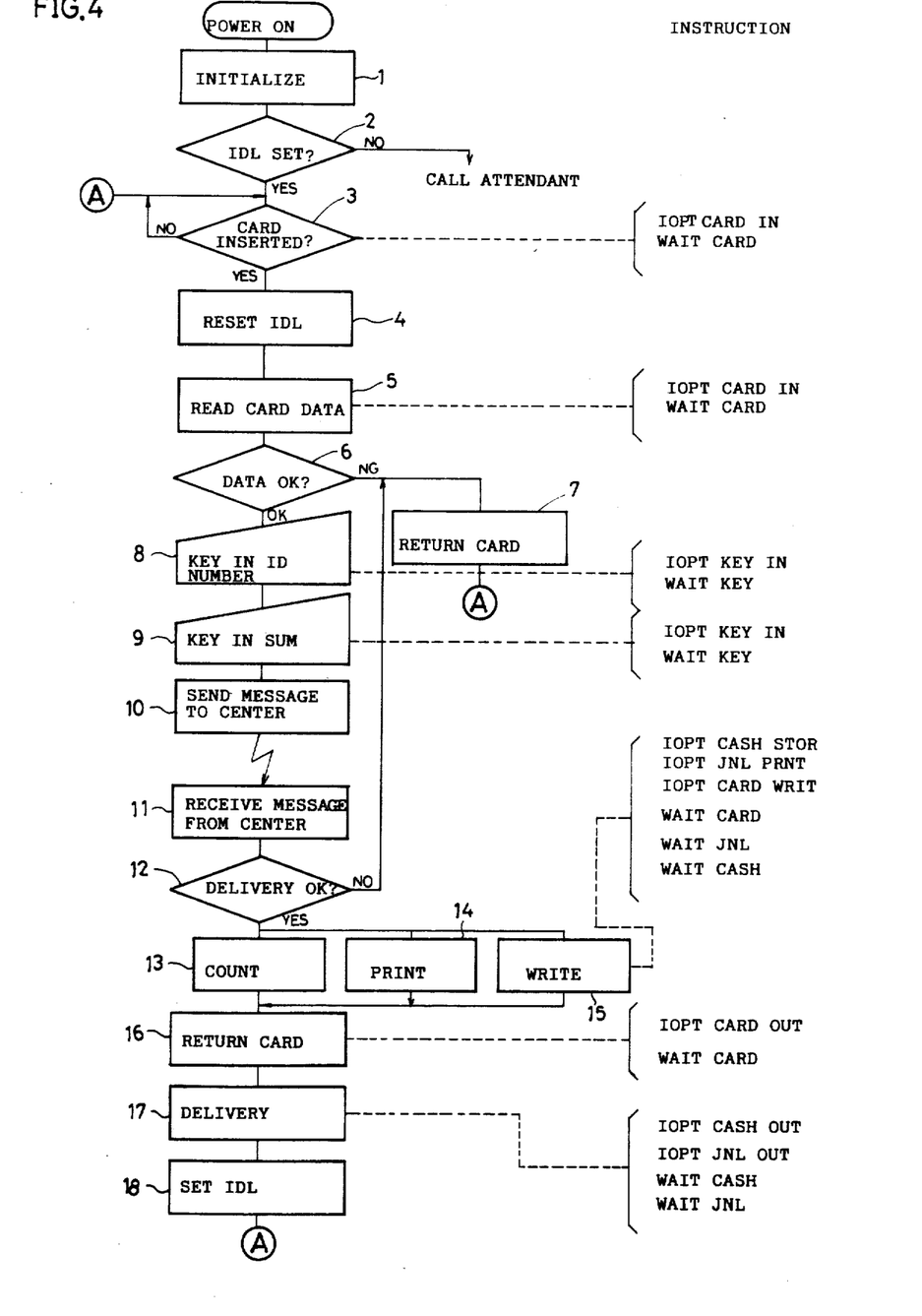
FIG. 4 is a flow chart schematically showing the main program of the main control assembly.

FIG. 4 schematically shows the main program of the main control assembly 100. For convenience, the flow chart does not show the control for the numerical display and procedure display for the customer operation panel and controller therefor 124. FIG. 4 also shows, on the right side of the blocks, instructions for the processes indicated in the blocks. First, the M-CPU 101 sets the scanning register flags to "1" at the memory locations T11 for the monitor panel and controller therefor 125 and the remote monitor 126 on the scanning table TM1 in the RAM 104 to register (initialize) these terminal units (Step 1). Next, whether or not an idle flag (IDL) has been set is checked (Step 2). The idle flag (IDL) is provided in a non-volatile memory (not shown) and is set when the power is turned on by the attendant. Since the idle flag (IDL) is reset during the processing of a transaction (reset in Step 4 and set in Step 18), the fact that the idle flag is found unset in Step 2 means that a power failure occurred during the performance of a transaction, followed by restoration of the power. In this case, the user turns on a buzzer or indicator lamp to call the attendant.

The terminal units are controlled, first for the magnetic card reader 121. Step 3 checks whether or not a card has been inserted into the card reader 121. With the card inserted, the idle flag (IDL) is reset (Step 4), and the card reader 121 reads the card data (Step 5). The insertion of the card is detected by a card detector (not shown) provided in the reader 121. The inserted card is checked whether or not it is proper, based on the card data read, for example, by checking whether or not the bank code in the card data is in agreement with the predetermined one (Step 6). Unless the card is a proper one, the card is returned (Step 7). This step is followed by Step 3.

When the inserted card is proper, the customer operation panel terminal unit 124 is controlled. The customer keys in his ID number (Step 8) and subsequently keys in the desired sum (Step 9). The data entered is transmitted to the main control assembly 100, in which the M-CPU 101 edits, in the area M3 of the RAM 104, a message containing transaction data such as the account number and sum. The message is sent to the control center (Step 10). The control center has a customer information file which has stored therein banking transaction data including the account number, balance, etc. of each customer. The center checks, for example, whether or not the account number in the data transmitted from the cash dispenser is contained in the file and whether or not the balance of the customer is larger than the requested sum, and transmits to the dispenser a message containing data permitting or not permitting the delivery of the sum. The message is transmitted from the center to the M-CPU 101 (Step 11), indicating whether or not the delivery of the cash is permitted (Step 12). In the event that the cash delivery is not permitted, the card is returned (Step 7).

When the delivery is permitted, the bank note delivery device 123, receipt issuing device 122 and card reader 121 are controlled at the same time. The device 123 is commanded to count the desired sum of bank notes and to temporarily hold the notes (Step 13). The issuing device 122 is commanded to print the transaction data on a receipt and the journal (Step 14), and the card reader 121 to write the required data, such as the balance, on the card (Step 15). This is followed by the return of the card (Step 16) and the delivery of the temporarily held bank notes and printed receipt (Step 17). The idle flag (IDL) is set in Step 18. Thus sequential control is completed. The subsequent sequential control is started with Step 3.

Figure 9:
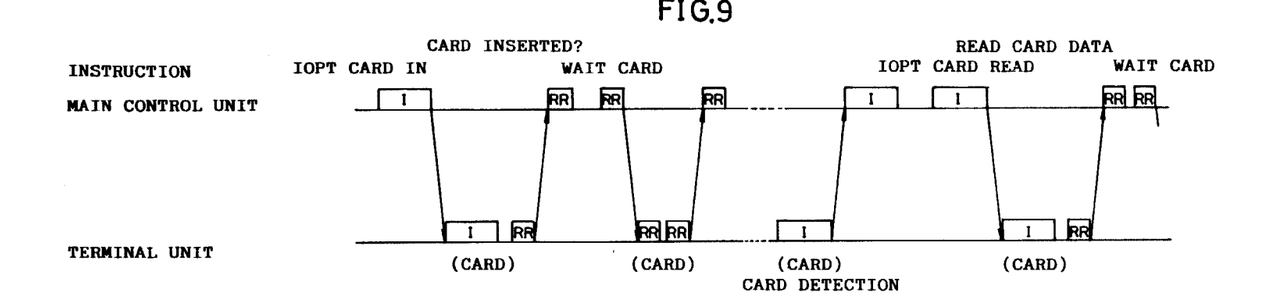
FIGS. 9 and 10 show how messages are exchanged between the main control assembly and terminal units during normal operation.

Steps 3 and 5 of the main program are performed for the card reader 121. During these steps, the main control assembly 100 communicates only with the reader 121 with the exception of scanning the terminal units 125 and 126 as will be described later. With reference to FIG. 9, one of the instructions involved in Step 3 comprises command IOPT, address CARD and control code IN (detection of inserted card). When an I frame message containing this instruction is given to the reader 121 according to the data communication program to be described later, the card reader 121 (the S-CPU 115 for controlling the reader 121) starts to detect the insertion of the card and gives the main control assembly 100 an RR frame message for confirming the receipt of the I frame message. Upon receipt of the RR frame messages, the main control assembly 100 transmits to the card reader 121 an RR frame message in which an instruction containing command WAIT and address CARD is edited. The card reader 121, when not detecting the insertion of the card, transmits an RR frame message to the assembly 100 again in response to the RR frame message received. Upon detecting the insertion of the card, the card reader 121 gives the main control assembly 100 an I frame message to the effect that the insertion of the card has been detected, whereby the communications for Step 3 are completed.

Similarly in Step 5, the main control assembly 100 transmits to the card reader 121 an I frame message having edited therein an instruction comprising a command IOPT, address CARD and control code READ (card data reading). In response to the message from the assembly 100, the card reader 121 starts reading the data on the inserted card and transmits a confirming RR frame message to the assembly 100. While the M-CPU 101 of the main control assembly 100 is thus performing Step 3 or 5 of the main program, the communications between the assembly 100 and the terminal units are concomitantly controlled as described hereinafter. Thus, it is that the assembly 100 communicates only with the reader 121 for which the instruction for Step 3 or 5 is intended.

The instructions for Steps 8 and 9 contain an address KEY for the keyboard included in the customer operation panel and controller therefor 124. In these steps, the main control assembly 100 exchanges messages only with the terminal unit 124. Similarly in Steps 13 to 17, the assembly 100 communicates only with the terminal units for which the instructions of these steps are intended.

Figure 5:
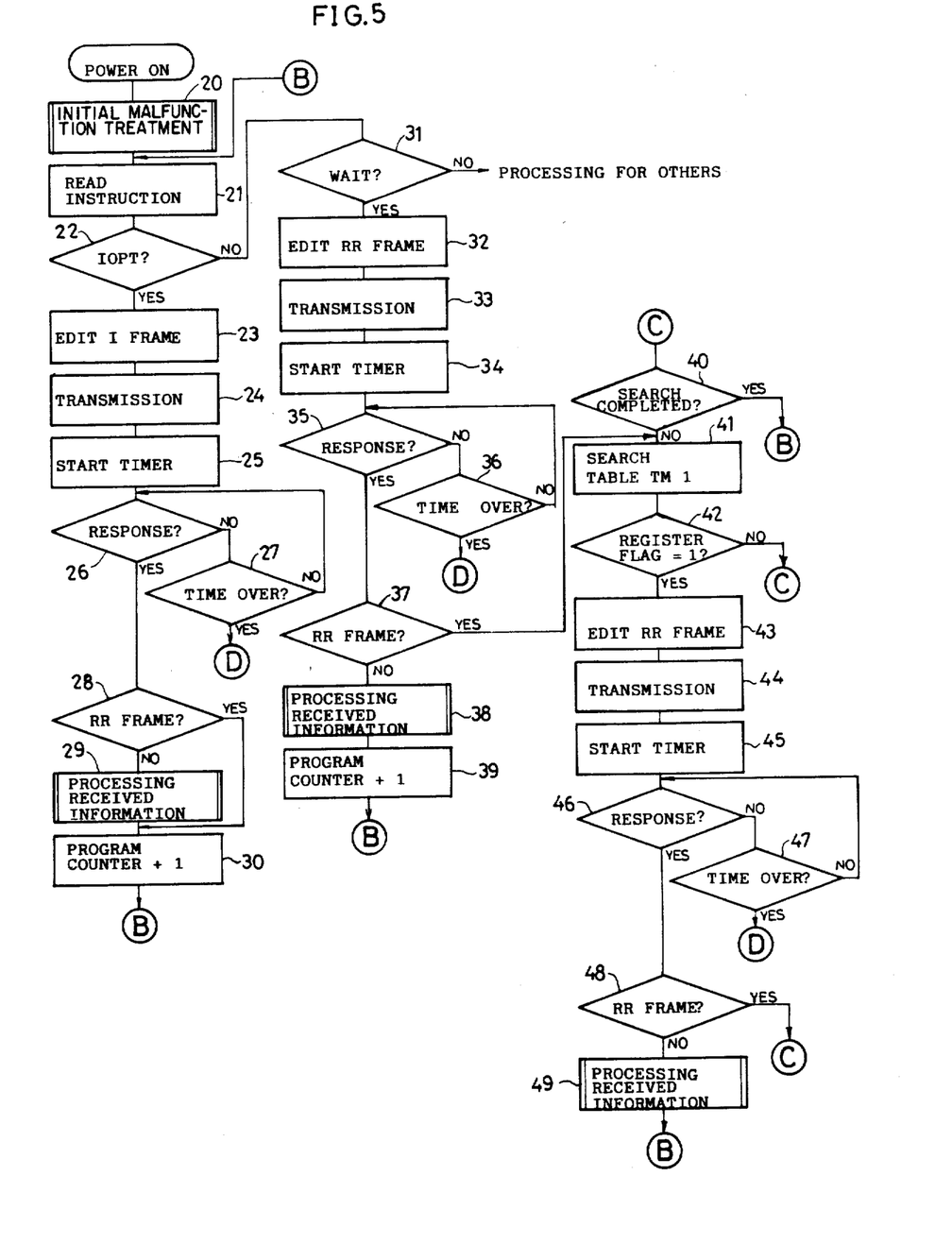
FIGS. 5 to 7 are flow charts schematically showing the communication control program of the main control assembly.

FIG. 5 shows a communication control program. The M-CPU 101, after performing the initial malfunction treatment to be described later (Step 20), reads an instruction from the main program in the ROM 102 (Step 21) and checks whether the command in the instruction is IOPT or WAIT (Steps 22, 31). If the command is neither IOPT nor WAIT, an other command will be processed. If the command is IOPT, an I frame message is edited in the area M2 of the RAM 104 with reference to the address and control code in the instruction (Step 23), and is transferred under DMA control (Step 24). At the same time, the response time monitoring timer 106 is started (Step 25). Subsequently Step 26 checks whether or not the terminal unit designated by the address in the message has responded. Upon receipt of a message from the terminal unit, the interface 108 feeds an interruption signal to the M-CPU 101. When there is no response from the terminal unit before the time set on the timer has elapsed (Step 27), the malfunction treatment to be described later will follow. When there is a response from the designated unit, Step 28 checks whether or not the response is an RR frame message. If the response is not an RR frame, the message contains some information, so that the information is processed (Step 29). For example, when card data is transmitted from the card reader 121 as the information, the data (in the area M1) is written to the area M5 of the RAM 104. If the response is an RR frame which is merely a confirming message and contains no information, Step 30 follows instead of Step 29 to add "1" to the contents of the program counter 105. Similarly Step 29 is followed by the addition of "1" to the contents of the program counter 105 (Step 30). Step 21 thereafter follows to read out the instruction designated by the contents of the counter 105 and repeat the same operation as above.

When the command is WAIT (Step 31), an RR frame message is edited in the area M2 of the RAM 104 (Step 32) and is transferred to the designated terminal unit under DMA control (Step 33). At the same time, the response time monitoring timer 106 is started (Step 34). If there is a response from the unit designated by the address in the message (Step 35), Step 37 checks whether or not the response message is an RR frame. If YES, Step 41 follows. If otherwise, the received information is processed (Step 38) as in Step 29. The contents of the program counter 105 is thereafter advanced by one (Step 39), and Step 21 follows again. When there is no response from the terminal unit the time set on the timer 106 is over (Step 36), malfunction treatment follows.

Communication control is thus accomplished by Steps 21 to 39 for the first group of terminal units 121 to 124. Steps 40 to 49 are performed for the communication control of the second group of terminal units, i.e. the monitor panel and controller therefor 125 and the remote monitor 126, which is executed concomitantly with the communication control for the first terminal units 121 to 124. When an RR frame message is transmitted to one of the terminal units 121 to 124 (Step 33), which in turn delivers an RR frame message (Step 37), Step 41 follows to initiate communication control for the other terminal units 125 and 126.

The scanning table TM1 in the RAM 104 is searched (Step 41) to check whether or not the scanning register flag in the memory location T11 for the unit 125 is set to "1" (Step 42). If the flag is "0", Step 40 follows to search whether or not all terminal units (i.e. the two units 125 and 126 in the present embodiment) on the table TM1 have been searched. The main control assembly 100 includes a counter for searching the table TM1, and every time the table has been searched for one terminal unit, the counter is advanced by one. The contents of the counter than indicate whether or not search for all the terminal units has been completed. When the search for all the units has been completed, the contents of the table searching counter are reset to the initial value, and Step 21 follows again.

When the scanning register flag is "1" (Step 42), the address of the unit stored in the corresponding memory location T12 is read out, and an RR frame message containing the address is edited in the area M2 of the RAM 104 (Step 43). The message is DMA-transferred to the terminal unit (Step 44). The response time monitoring timer 106 is also started (Step 45). Step 46 checks whether or not there is a response, within a specified period of time, from the unit designated by the address of the message (Step 46). The response message, if received, is checked as to whether or not the message is an RR frame (Step 48). In the absence of the response within the specified time (Step 47), malfunction treatment is conducted.

The monitor panel and controller therefor 125 and the remote monitor 126 are intended for checking and controlling the state of operation of the automatic cash dispenser and are provided with various switches, setting devices, etc. as already described. If there is a change in the state of such a switch or device, the terminal unit 125 or 126 replies to the main control assembly 100 with an I frame message indicating the change (corresponding to Step 46), in response to an RR frame message from the assembly 100 (corresponding to Step 44). When there is no change in the state of the switch, setting device or the like, the unit 125 or 126 responds to the assembly 100 with an RR frame message. When the response message from the terminal unit 125 or 126 is an RR frame in the communication control by the main control assembly, Step 48 is followed by Step 40 again. If the reply from the unit 125 or 126 is not an RR frame but an I frame containing some information, the received information is processed according to a subprogram with reference to the address stored in the memory location T13 in the table TM1 (Step 49). Step 49 is followed by Step 21 again. When Step 37 proves "YES" again, Steps 40 to 49 are performed.

In this way, the communication between the main control assembly 100 and the second group of terminal units 125 and 126 follows the exchange of RR frame messages between the assembly 100 and the first group of terminal units 121 to 124. Thus, although the main program does not include the processing for the terminal units 125 and 126, the communication between the main control assembly 100 and the terminal units 125 and 126 can be accomplished.

Figure 10:
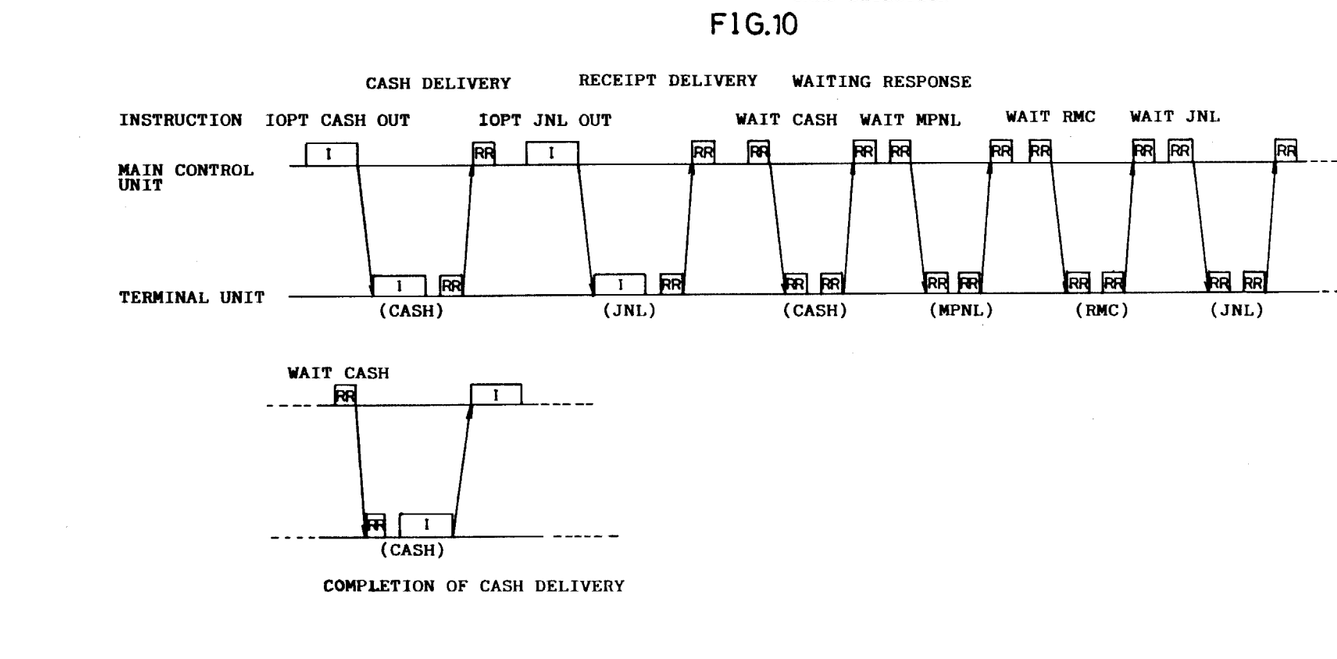

FIG. 10 shows how the main control assembly 100 communicates with the monitor panel and controller therefor 125 and the remote monitor 126, concomitantly with Step 17. When the assembly 100 edited and delivered an I frame message containing an instruction comprising command IOPT, address CASH and control code OUT (delivery of bank notes) (Steps 23 and 24), the bank note delivery device 123 transmits to the assembly 100 an RR frame message confirming the receipt of the I frame message. On receiving the RR frame message (Step 28), the assembly 100 adds "1" to the contents of the program counter 105 (Step 30) and reads out the next instruction (Step 21). This instruction is composed of a command IOPT, address JNL and control code OUT (delivery of receipt). An I frame message containing this instruction is edited and transmitted (Steps 23 and 24), whereupon the receipt issuing device 122 gives the assembly 100 an RR frame message confirming the receipt of the message (Step 28). The program counter 105 is advanced again by "1" (Step 30). The subsequent instruction is composed of a command WAIT and address CASH. The main assembly 100 edits and gives an RR frame message containing the instruction (Steps 32 and 33). In response to the RR frame message, the bank note delivery device 123 replies with an RR frame message. Consequently Step 37 is YES, followed by Step 41.

If the terminal unit 125 is registered in the table TM1 (Step 42), the assembly 100 delivers an RR frame message containing a command WAIT and address MPNL (Steps 43 and 44). In response to an RR frame message from the unit 125 (Step 48) and if the remote monitor 126 is registered in the table TM1 (Step 42), an RR frame message containing a command WAIT and address RMC is transmitted to the monitor 126 (Steps 43 and 44). If the monitor 126 replies with an RR frame message similarly (Step 48), Step 40 follows. Since the table has been completely searched in this way, "1" is added to the contents of the program counter 105 (this block is not shown). Step 21 then follows again. If one of the units 125 and 126 delivers information with a message other than RR frame, the information is processed (Step 49), followed by the addition of "1" to the contents of the counter 105 and Step 21.

A further instruction is composed of a command WAIT and address JNL. The assembly 100 delivers an RR message containing this instruction (Step 33). When there is a response from the issuing device 122 with an RR frame message (Step 37), Step 41 follows again, and inquires for the units 125 and 126 are made. When the search has been completed (Step 40), or information delivered from the units 125 and 126 has been processed (Step 49), Step 21 follows.

The assembly 100 gives an RR frame message containing a command WAIT and address CASH (Step 33). When there is a response from the device 123 with an I frame message notifying that the bank notes have been delivered (NO for Step 37), the attendant process is performed (Step 38). Similarly when there is a reply from the issuing device 122 to the effect that the receipt has been delivered, in response to an RR frame message transmitted to the device 122, Step 17 is completely terminated.

The scanning for the second group of terminal units 125 and 126 is conducted not only during Step 17 but also in Step 3, Step 5 and other steps, every time when the main control assembly 100 transmits an RR frame message to one of the first group of terminal units 121 to 124, followed by an RR frame reply from the unit in response to the message. In this case, Step 37 is invariably accompanied by Step 41 for the scanning.

When a terminal unit develops a malfunction (e.g. power failure), when the malfunction is remedied and when a terminal unit detects malfunction in the main control assembly, during the control of the first group of terminal units 121 to 124 by the assembly 100 and during the scanning of the other terminal units 125 and 126 by the assembly, the main and terminal units are notified of such a malfunction in the following manner.

(1) When a message transmitted from the main assembly to the terminal unit is not responded to by the terminal unit designated by the address of the message at least for a specified period of time, the assembly judges that a malfunction (power failure) occurred in the terminal unit and sets the malfunction flag of the unit to "1" in the malfunction treating table TM2 for the treatment of the trouble.

(2) When the main control assembly is to transmit a message containing some command to the terminal with a malfunction flag set, the assembly first transmits an IM frame message to the unit to check whether or not the unit is responsive. If there is a response from the unit to the IM frame message, the assembly resets the malfunction flag, and transmits the message containing the command.

(3) When the power is turned on or restored, the terminal unit remains non-responsive to messages containing any command and given by the main control assembly, until the unit receives an IM frame message.

(4) After receiving the IM frame message, the terminal unit responds, as usual, to a command-containing message from the main control assembly.

(5) The terminal unit checks whether or not some message is transmitted, within a specified time interval, from the main control assembly to any of the terminal units. If no message is transmitted from the main assembly for more than the specified period of time, the terminal units remain non-responsive until the receipt of an IM frame message.

Figures 6, 7:
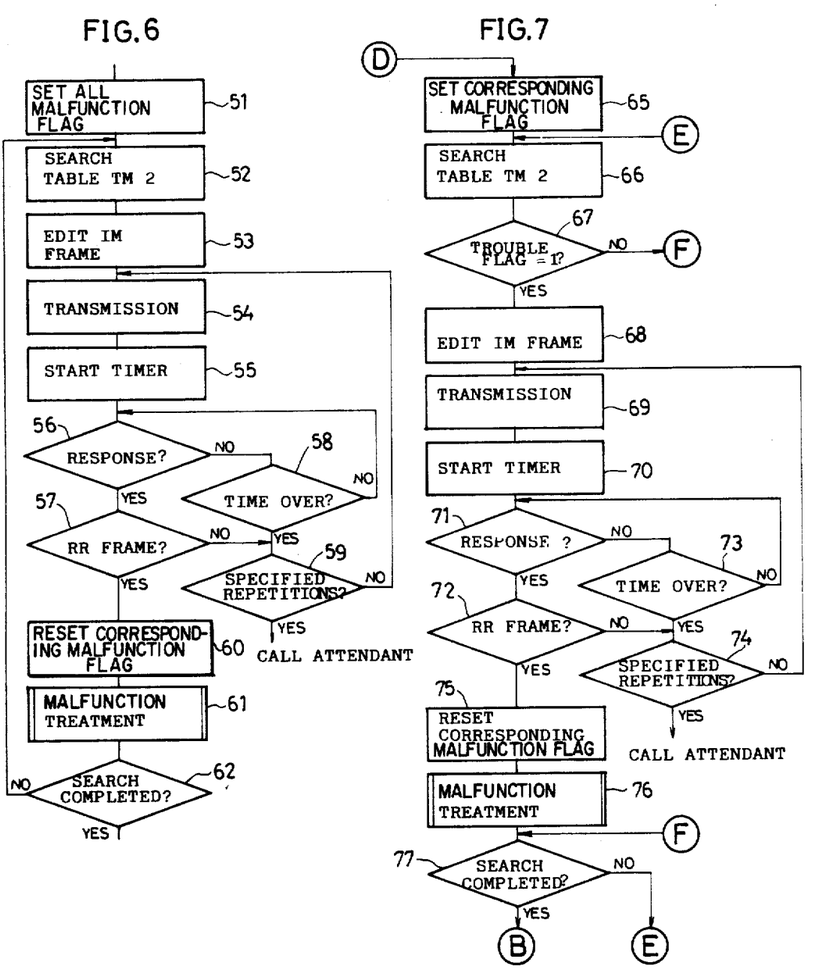

FIG. 6 shows the procedures for the initial malfunction treatment (FIG. 5, Step 20). First, the malfunction flags on the malfunction treating table (TM2) in the memory locations T21 are set for all the terminal units (Step 51). The table TM2 is searched (Step 52) to read out the address (in memory location T22) of a terminal with a set malfunction flag, an IM frame message containing the address is edited in the area M2 of the RAM 104 (Step 53), and the IM frame message is DMA-transferred (Step 54). The response time monitoring timer 106 is then started (Step 55). The assembly checks whether or not there is a response from the terminal unit designated by the address in the IM frame message (Step 56). When there is an RR frame response from the designated terminal unit within the time set on the timer 106 (Step 57), this indicates that the unit is free of any malfunction, so that the malfunction flag for the unit concerned is reset (Step 60). The malfunction treating program designated by the address stored in the corresponding location T23 is then executed (Step 61). (Since the unit has no malfunction, nothing is done at this time.) Step 62 checks whether or not the malfunction flag search on the table TM2 has been completed for all the terminal units. If the search has not been completed, Step 52 follows to repeat the same procedure as above.

If the time set on the response time monitoring timer 106 has elapsed without any response from the addressed terminal unit after the delivery of an IM frame message (Step 58), or if the response from the unit is not an RR frame message (Step 57), a transmission error is involved, so that the IM frame message is transmitted repeatedly a predetermined number of times (Step 59). When Step 57 still proves "NO" or Step 58 "YES" despite the repetitions of transmission of the IM frame message, the bank attendant is called.

FIG. 7 shows the procedures of malfunction treatment. After the transmission of some message from the assembly 100 to a terminal unit, and when the time set on the timer 106 has elapsed with no reply from the designated unit (FIG. 5, Steps 27, 36 and 47), the same message as in Step 59 is repeatedly transmitted a specified number of times (this step is not shown). If there is no response from the designated terminal unit despite the repetitions of transmission, Step 65 follows to set the malfunction flag (memory location T21) of the unit designated by the address of the message. The table TM2 is searched for a malfunction flag (Step 66). If there is a set malfunction flag (Step 67), the address (memory location T22) of the terminal unit corresponding to the set flag is read out, an IM frame message containing the address is edited in the area M2 (Step 68) and transmitted to the terminal unit (Step 69), and the response time monitoring timer 106 is started (Step 70). Step 71 checks whether or not there is a response from the designated terminal unit. If the response message is an RR frame (Step 72), the malfunction flag corresponding to the unit is reset (Step 75), and trouble treatment is conducted under the program designated by the address stored in the memory location T23 (Step 76). Step 77 thereafter checks whether or not search has been completed for the entire table TM2 (Step 77). If the search still remains to be completed, Step 66 follows to search for a set malfunction flag. Completion of the search is accompanied by Step 21 (FIG. 5).

After the transmission of the IM message, if the time set on the timer 106 is over (Step 73) or if the response from the terminal unit is not an RR frame messsage (Step 72), the IM frame message is transmitted repeatedly a predetermined number of times (Step 74). When Step 72 still proves "NO" or Step 73 "YES", the attendant is called. When the malfunction flag searched for is not set in Step 67, Step 77 follows to check whether or not the search has been completed.

Figure 8:
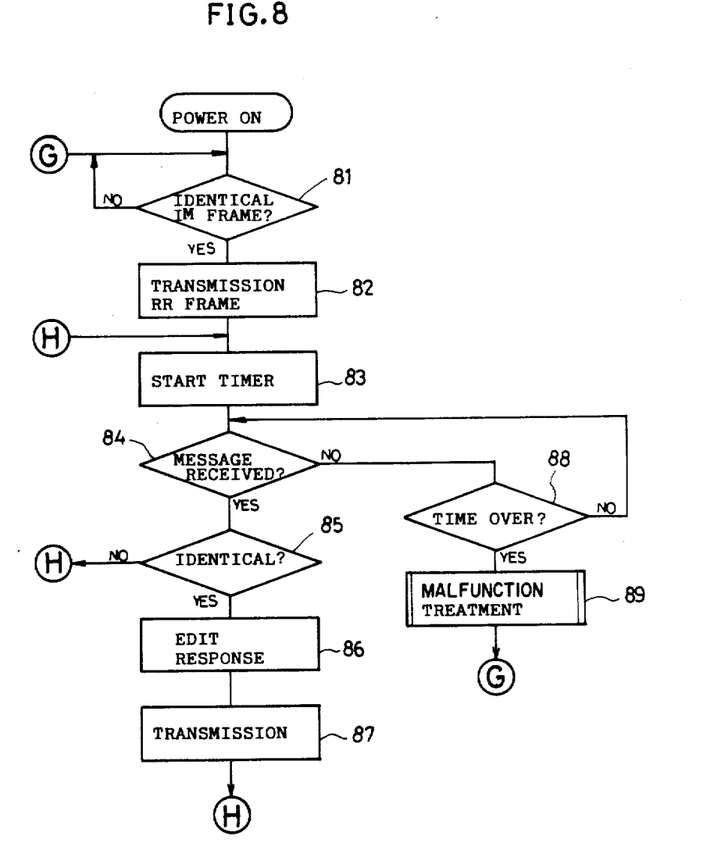
FIG. 8 is a flow chart showing procedures of communication control for a terminal unit.

FIG. 8 shows the procedures of communication control for each terminal unit. After the power is restored (or turned on), and after the malfunction in the main control assembly 100 has been treated (Step 89), each terminal unit transmits an RR frame message (Step 82) only upon receiving an IM frame message having an address identical with its own address (Step 81). After the transmission of the RR frame message, the communication interval monitoring timer 118 is started (Step 83).

Each terminal unit checks at all times whether or not some message is transmitted from the assembly 100 to the terminal unit (Step 84). When a message is received from the assembly 100, the interface 119 feeds an interruption signal to the S-CPU 115, which therefore is notified of the receipt of the message. Upon receiving some message from the central control assembly 100 free of any transmission error, the terminal unit checks the received message as to whether or not the message contains the address to identify the message as one intended for that unit (Step 85). When the message is not intended for the unit, Step 83 is followed to restart the timer 118 and check the message from the assembly 100 again. If the received message is intended for the unit, a message in response to the message is edited (Step 86) and transmitted to the assembly 100 (Step 87). Step 83 thereafter follows to restart the timer 118. The terminal unit performs processing in accordance with the contents of the received message.

The message to be checked for receipt in Step 84 may be any message, including one containing the address of another terminal unit or an IM frame message. Steps 83 to 85 check whether or not some message is transmitted, within a specified time interval, from the main control assembly 100 to a terminal unit. If no message is received within the period of time set on the timer 118 (Step 88), the unit judges that a malfunction occurred in the assembly 100 and conducts the specified malfunction treatment, for example, transmission of a message to that effect to the assembly 100 (Step 89). Step 81 then follows. When a message involving a transmission error is received, Step 84 provides "NO." Thus each terminal unit resets its communication interval monitoring timer 118 not only when receiving a message of identical address (i.e. message intended for the unit) but also when receiving a message addressed to another terminal unit, provided that the message does not involve a transmission error, so that there is no need for the assembly 100 to transmit a message to each terminal unit for the purpose of resetting the timer of the unit.

Figure 11:
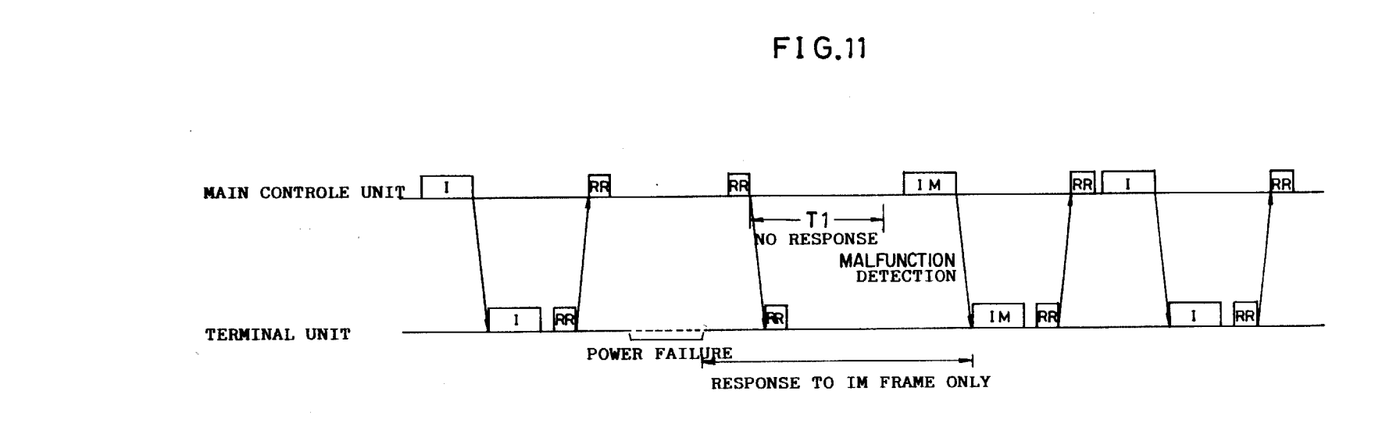
FIGS. 11 and 12 show how messages are exchanged between the main control assembly and terminal units when a malfunction has occurred.

FIG. 11 shows how messages are exchanged between the main control assembly 100 and the terminal unit when a power failure occurs temporarily in the unit and the power is thereafter restored. In the usual state, RR frame and I frame messages are repeatedly exchanged between the assembly 100 and the unit. In the event of a power failure in the unit, followed by restoration, the unit becomes non-responsive to messages other than an IM frame message (FIG. 8, Step 81). Accordingly even when the assembly 100 transmits, for example, an RR frame message (FIG. 5, Steps 32 and 33), the receiving unit remains non-responsive even after the lapse of the time T1 set on the timer 106 (Step 36). The unit 100 therefore sets the malfunction flag of the unit concerned (FIG. 7, Step 65) and transmits an IM frame message to the unit (Steps 68 and 69). In response to the IM frame message, the unit transmits an RR frame message to the assembly 100 (FIG. 8, Steps 81 and 82). The assembly 100, on receiving the RR frame message (FIG. 7, Step 72), resets the malfunction flag of the unit (Step 75) to restore the usual state.

Figure 12:
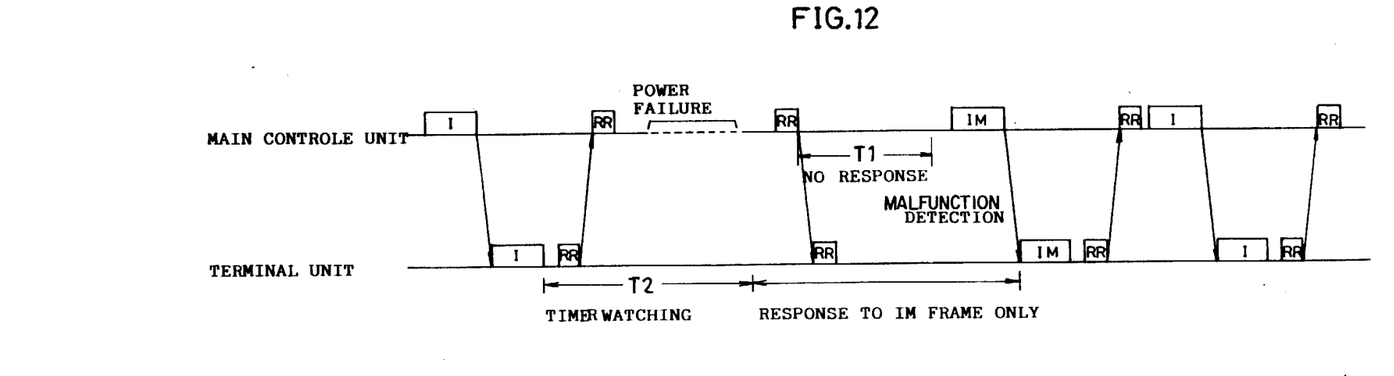

FIG. 12 shows how messages are exchanged between the main control assembly 100 and the terminal unit when a power failure occurs temporarily in the main control assembly and the power is thereafter restored. When a temporary power failure occurred in the assembly, the terminal unit fails to receive messages for more than the period of time T2 set on the timer 118 (FIG. 8, Step 88) and consequently becomes non-responsive to messages other than an IM frame message (Step 81). Accordingly even if the assembly 100 transmits, for example, an RR frame message to the unit after the power is restored, the unit remains non-responsive for more than the specified period of time T1. At this time, therefore, the assembly 100 realizes that the unit is non-responsive due to the power failure of the assembly itself. The assembly then sets the malfunction flag (FIG. 7, Step 65) and delivers an IM frame (Steps 68 and 69), in response to which the unit feeds an RR frame message (FIG. 8, Steps 81 and 82, and FIG. 7, Step 72). The flag is reset (Step 75) to restore the normal state.

After the restoration of the power, the assembly 100 performs the initial malfunction treatment (FIG. 5, Step 20 and FIG. 6), in which the assembly 100 gives an IM frame message (Steps 53 and 54). In FIG. 12, the assembly 100, after restoring the power, will not transmit an RR frame. For a clarified description of the operation, FIG. 12 shows RR frame messages. Although the above description is given for the case in which power failures occurred in the assembly and terminal unit, this invention is of course useful for other malfunctions.

Figure 13:
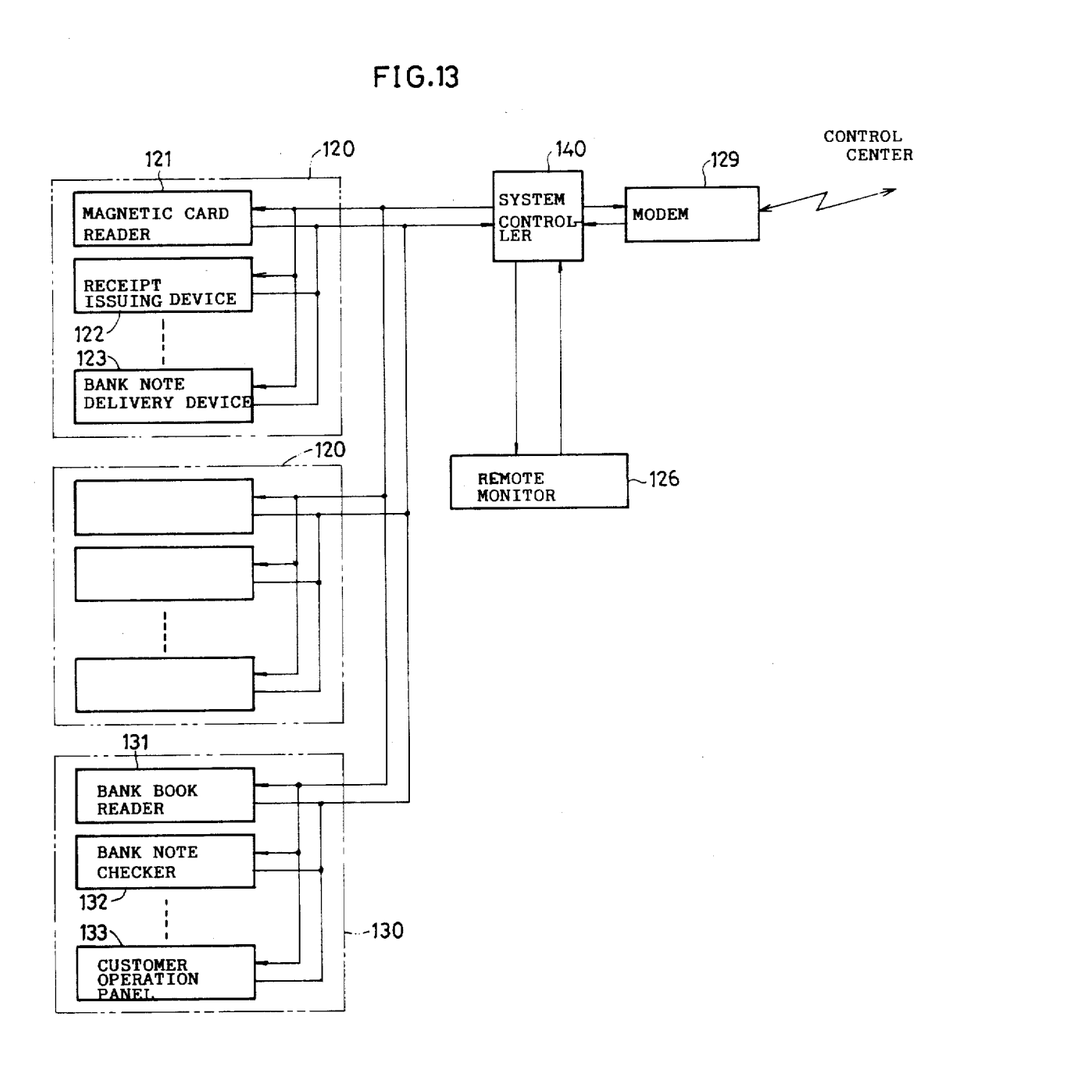
FIG. 13 is a block diagram showing another embodiment including a system controller.

FIG. 13 shows one system controller 140 used for controlling a plurality of automatic cash dispensers 120 and an automatic cash depositing machine 130. The dispensers 120 have the same construction as the one shown in FIG. 1. The depositing machine 130 has a bank book reader 131 for reading or writing on the magnetic strips on bank books, a bank note checker 132 for discriminating the face value and genuineness of the bank notes inserted, a customer operation panel 133, etc. These terminal units are controlled also by S-CPU (not shown). The system controller 140 has M-CPU, ROM having stored therein various programs, RAM for storing data, program counter, monitoring timer, communication controlling interfaces, etc. The present invention is useful also for such a system.

What is claimed is:

1. A system for controlling communication between a main control assembly having a central processing unit and a plurality of individually programmable input/output terminal units each having a slave central processing unit and a program to control the operation of the respective input/output terminal unit, each of said input/output terminal units having a different address, and communication means including a set of communication lines connecting said main control assembly to all of said terminal units, and interface means in said main control assembly and in each of said terminal units and connected to said set of communication lines for serially transmitting messages between said main control assembly and said terminal units, said system comprising:

means in said main control assembly for controlling said input/output terminal units including memory means having stored therein instructions including instructions for controlling said input/output terminal units in a predetermined sequence, processing means for reading said instructions and editing a message corresponding to an instruction for transmission to a selected one of said input/output terminal units including the address of said selected unit, and means for transmitting said message to said selected input/output terminal unit via said communications means; and means in said main control assembly for controlling the communication between said main control assembly and said input/output terminal units to cause said main control assembly, to address a message to a selected input/output terminal unit and, after a response is received from said selected input/output terminal unit indicating completion of the instruction, to cause said main control assembly to read the next instruction.

2. A system as defined in claim 1 wherein each of said instructions stored in said memory means for controlling said input/output terminal units contains the address of the one of said input/output terminal units to be controlled by said instruction.

3. A system for controlling communication as recited in claim 1 including means for monitoring and communicating malfunction information comprising:

a response time monitoring timer in said main control assembly, means for setting said timer when a message is transmitted to a selected input/output terminal unit, means for resetting said timer when a response is received from said addressed input/output terminal unit within a predetermined time period set in said response time monitoring timer, means responsive to a failure to reset said response time monitoring timer within said predetermined time period to set a malfunction indication indicating that said selected input/output terminal unit has experienced a malfunction, and means responsive to said malfunction indication to cause said main control assembly to address an IM frame message including an initial command to said input/output terminal unit;

means in each of said input/output terminal units for detecting malfunctions in the respective unit and, in response to detection of a malfunction, to set said unit to respond only to such an IM frame message addressed to that unit; and means in each of said terminal units responsive to such an IM frame message addressed thereto and received after correction of a malfunction therein to reset said terminal unit in its normal response mode.

4. A system for controlling communication between a main control assembly having a central processing unit, a first group of individually programmable input/output terminal units each having a slave central processing unit and a program to control the operation of the respective input/output terminal unit, said first group of terminal units being controlled in a predetermined sequence, and at least one other input/output terminal unit not included in said predetermined sequence, each of said terminal units having a different address, and communication means including a set of communication lines connecting said main control assembly to all of said first group of terminal units, communciation lines connecting said main control assembly to said other terminal unit, and interface means in said main control assembly and in each of said terminal units connected to said communication lines for serially transmitting messages between said main control assembly and said terminal units, said system comprising:

means in said main control assembly for controlling said input/output terminal units including memory means having stored therein instructions including instructions for controlling said input/output terminal units, processing means for reading said instructions and editing a message corresponding to an instruction for transmission to a selected one of said input/output terminal units including the address of said selected unit, and means connected to said communication means for transmitting said message to said selected input/output terminal unit;

communication control means in said main control assembly for controlling the communication between said main control assembly and said input/output terminal units to cause said main control assembly to address a message to a selected one of said first group of input/output terminal units and to cause said main control assembly to read the next instruction after a response is received from said selected input/output terminal unit indicating completion of the instruction addressed to said selected input/output terminal unit; and     means in said communication control means for detecting non-completion of said instruction in the response from said input/output terminal unit to said main control assembly and thereupon to cause said main control assembly to address a message to said other input/output terminal unit which is not included in said predetermined sequence.

5. A system for controlling communication of malfunction information between a main control assembly having a central processing unit and a plurality of individually programmable input/output terminal units connected to said main control assembly by a set of communication lines, each of said input/output terminal units including a slave central processing unit and a program to control operation of the respective unit, each of said units having a different address, said system comprising:

means in each of said terminal units for detecting malfunctions in the respective unit and means in each unit responsive to detection of a malfunction to set said unit so it responds only to an IM frame message including an initial command addressed to that unit; and     response time monitoring timer means in said main control assembly operable upon failure of a terminal unit to respond to a message addressed to that unit within a predetermined time period to send an IM frame message including such command addressed to that unit.

6. A system as set forth in claim 5 wherein at least one of said input/output terminal units includes communication interval monitoring timer means for monitoring the communication interval between messages transmitted by said main control assembly, means for resetting said communication interval monitoring timer means when a message transmitted to any one of said input/output terminal units is received by said one of said terminal units within a predetermined time period set in said communication interval monitoring timer means, and means responsive to failure to reset said communication interval monitoring timer means to set said one of said terminal units to respond only to an IM frame message addressed thereto.

7. A system for controlling communication of malfunction information between a main control assembly and a plurality of individually programmable input/output terminal units connected to said main control assembly by a set of communication lines, each of said terminal units including a slave central processing unit and a program to control operation of the respective unit, said main control assembly including means for transmitting messages to said terminal units containing the addresses of said terminal units and each terminal unit including means responsive to a message addressed thereto to transmit to said main control assembly a response containing its own address, said system comprising:

communication interval monitoring timer means in at least one of said input/output terminal units for monitoring the communication interval between messages transmitted by said main control assembly, means for resetting said communciation interval monitoring timer means when a message transmitted to any one of said input/output terminal units is received by said one of said terminal units within a predetermined time period set in said communication interval monitoring timer means, and means in said one of said terminal units responsive to failure to reset said communication interval monitoring timer means to set said one of said terminal units to respond only to an IM frame message including an initial command addressed to said one of said terminal units.

8. In a data communication system between a main control assembly and a plurality of individually programmable input/output terminal units connected thereto by a set of communication lines wherein said main control assembly communicates individually with each of said terminal units via said communication lines by addressing messages thereto containing the address of that terminal unit and said addressed terminal unit responds to said main control assembly with a message containing its own address, the method of monitoring and communicating malfunctions in said terminal units to said main control assembly comprising the steps of:

monitoring at each input/output terminal unit the proper functioning of the respective unit, and, if a malfunction has occurred, setting said malfunctioning terminal unit so that it will respond only to an IM frame message including an initial command addressed thereto by said main control assembly;

measuring at said main control assembly the time period between transmission of a message to an addressed terminal unit and the receipt of a response message from said addressed terminal unit;

determining when said measured time period exceeds a predetermined time period;

when said measured time period exceeds said predetermined time period, storing in said main control assembly an indication of a malfunction in said input/output terminal unit; and     causing said main control assembly to address an IM frame message to said terminal unit to determine whether the malfunction has been cleared.

9. In a data communication system between a main control assembly and a plurality of individually programmable input/output terminal units connected thereto by a set of communication lines wherein said main control assembly communicates individually with each of said terminal units via said communication lines by addressing meassages thereto containing the address of that terminal unit, and said addressed terminal unit responds to said main control assembly with a message containing its own address, the method of monitoring and communicating malfunctions in said data communication system comprising the steps of:
- monitoring in at least one of said terminal units messages transmitted to all of said terminal units on said set of transmission lines;
- measuring the time period between messages received;
- determining when said measured time period exceeds a predetermined time period; and
- when said measured time period exceeds said predetermined time period, thereby indicating occurrence of a communication malfunction, setting said one of said terminal units to respond only to an IM frame message including an initial command addressed thereto by said main control assembly as a means of communicating to said main control assembly the occurrence of such malfunction.

10. In a system for controlling communication between a main control assembly (MCA) having a central processing unit and a plurality of individually programmable input/output terminal units (IOTU), said MCA having a main control program stored in memory means, said main control program comprising instructions including instructions for controlling said IOTU in a predetermined sequence, each of said controlling instructions also containing the address of the IOTU to be controled by said instructions, each said IOTU having a slave central processing unit and a program to control the operation of the respective IOTU in response to messages received from said MCA and each said IOTU having a different address, and communications means including a set of communication lines connecting said MCA to all of said IOTU and interface means in said MCA and in each IOTU connected to said set of comunication lines for serially transmitting messages between said MCA and said IOTU, the method of controlling communication in said system comprising the MCA performing the steps of:
- (A) reading said instruction stored in said memory and editing a message corresponding to an instruction for transmission to a selected IOTU, said message including the address of said IOTU and an instruction to said IOTU,
- (B) transmitting said message to said selected IOTU via said communication means,
- (C) awaiting a response from said selected IOTU, and
- (D) after a response is received from said selected IOTU indicating completion of the instruction transmitted thereto, reading the next instruction stored in said memory and performing accordingly.

11. In a system comprising a plurality of input/output terminal units (IOTU) and a main control assembly (MCA) for controlling said IOTUs, said IOTUs and said MCA being connected to each other by serial transmission lines, a system for input/output control comprising:
- a main control program comprising instructions for controlling said IOTUs and a communication control program stored in a memory of said MCA;
- said instructions for controlling said IOTUs comprising "input/output" instructions to cause said IOTUs to execute predetermined operations and "wait" instructions for maintaining synchronization, said instructions each including the address of an IOTU to be controlled thereby, said instructions for controlling an IOTU being arranged in said memory of said MCA in such a sequence that an "input/output" instruction is followed by a "wait" instruction; and
- wherein said system is controlled by said communication control program in such a way that said instructions are read out one by one in said sequence, and when an instruction relating to input/output control of an IOTU is read out a message corresponding to that instruction is edited and transmitted to the IOTU addressed therein, and when a wait instruction is read out and transmitted to said IOTU, the next instruction is read out only after a response including substantial data is received from said IOTU.

12. In a system comprising a plurality of individually programmable input/output terminal units (IOTU) and a main control assembly (MCA) for controlling said IOTUs, said MCA and IOTUs being connected to each other by serial data transmission means, wherein said MCA has stored therein a main program and a communication control program;
- said plurality of IOTUs including a first group of IOTUs controllable in a predetermined sequence according to said main program and at least a second IOTU communicable with in accordance with a separate processing table, each said IOTU having an individual address; and
- said main program having instruction therein for controlling said first group of IOTUs including "input/output" instructions to cause said units to execute predetermined operations and "wait" instructions for maintaining synchronization, each "input/output" instruction being followed by a "wait" instruction, and each of said instructions including the address of an IOTU to be controlled by said instructions, wherein said MCA is operative in accordance with said communication control program to cause said MCA to perform the method of controlling communications in said system comprising performing the steps of:
- (A) reading an instruction stored in said main program;
- (B) if said instruction is an "input/output" instruction, transmitting said instruction to the IOTU the address of which is included in said instruction and awaiting a response therefrom, and when a response to said "input/output" instruction is received from said IOTU, executing any necessary processing in accordance with said response, and reading the next instruction;
- (C) if said instruction is a "wait" instruction, transmitting said instruction to said IOTU and awaiting a response therefrom;
- (D) if said response to said "wait" instruction does not include substantial data, searching said processing table and transmitting a message to a selected one of said second group of said IOTUs; and
- (E) if said response to said "wait" instruction includes substantial data, executing any necessary processing in accordance with said response, and reading the next instruction.

* * * * *